United States Patent [19]

Yamada et al.

[11] Patent Number: 5,249,250
[45] Date of Patent: Sep. 28, 1993

[54] OPTICAL DEVICE HAVING DOMAIN STRUCTURE AND METHOD FOR MANUFACTURING THE SAME

[75] Inventors: Masahiro Yamada; Koichiro Kishima, both of Kanagawa; Ayumu Taguchi, Tokyo, all of Japan

[73] Assignee: Sony Corporation, Tokyo, Japan

[21] Appl. No.: 727,942

[22] Filed: Jul. 10, 1991

[30] Foreign Application Priority Data

Jul. 12, 1990 [JP] Japan .................................. 2-184638
Feb. 20, 1991 [JP] Japan .................................. 3-026358
Mar. 12, 1991 [JP] Japan .................................. 3-046859

[51] Int. Cl.$^5$ .................................................. G02B 6/00
[52] U.S. Cl. .................................... 385/122; 359/328
[58] Field of Search ............... 359/237, 240, 241, 245, 359/250–252, 326–332; 385/122, 129–132, 141

[56] References Cited

U.S. PATENT DOCUMENTS

| | | | |
|---|---|---|---|
| 3,781,086 | 12/1973 | Kumada et al. | 359/251 |
| 4,155,055 | 5/1979 | Phillips | 333/153 |
| 4,865,406 | 9/1989 | Khanarian et al. | 385/122 |

FOREIGN PATENT DOCUMENTS

2-93624 4/1990 Japan .................................. 359/328

OTHER PUBLICATIONS

Feng et al, "Enhancement of Second-Harmonic Generation in LiNbO$_3$ Crystals . . . ", *Appl. Phys. Lett.* 37(7), Oct. 1980, pp. 607–609.
Publication Journal of Applied Physics 50(7) Jul. 1979 pp. 4599–4603 "Ferroelectric Domain Inversion in Ti--diffused LiNbO$_3$ Optical Waveguide" by Shintaro Miyazawa.
Electronics Letters 1st Feb. 1990, vol. 26 No. 3 pp. 188–189 "Fabrication Of Domain Reversed Gratings For SHG in LinbO$_3$ by Electron Beam Bombardment", Keys et al.
"Blue Light Generated by Frequency Doubling of Laser Diode Light in a Lithium Niobate Channel Waveguide" by Webjörn et al. in IEEE Photonics Technology Letters 1 (1989) Oct., No. 10, New York, US.
Article "Second-Harmonic Generation of Green Light in Periodically Poled Planar Lithium Niobate Waveguide" 8030 Electronics Letters 25 (1989) 2 Feb., No. 3 Stevenage.
Article Physical Review, vol. 127, No. 6 Sep. 15, 1962 entitled "Interactions between Light Waves in a Nonlinear Dielectric" by Armstrong et al. pp. 1918–1939.
Article Applied Physics Letters vol. 37 (1980) Oct. No. 7, New York, pp. 607–609, Feng et al.

*Primary Examiner*—Akm E. Ullah
*Attorney, Agent, or Firm*—Hill, Steadman & Simpson

[57] ABSTRACT

An optical device having a periodic inverted domain construction is used for second harmonic generating devices or the like. The optical device comprises a ferroelectric crystal substrate which is provided in this surface with a periodic inverted domain structure consisting of a plurality of parallel inverted domain regions arranged at intervals. The thickness t and width w of the inverted domain regions and the thickness T of the ferroelectric crystal substrate meet the criteria expressed by: $t/w \geq 1$ and $0.1 < t/T \leq 1$.

2 Claims, 12 Drawing Sheets

FIG.16
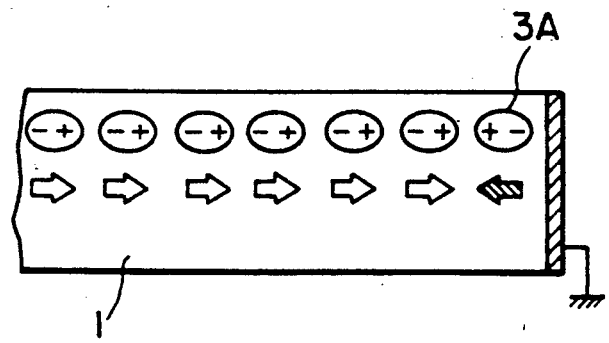
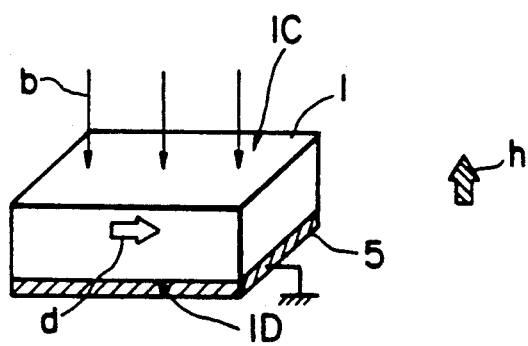
FIG.17A
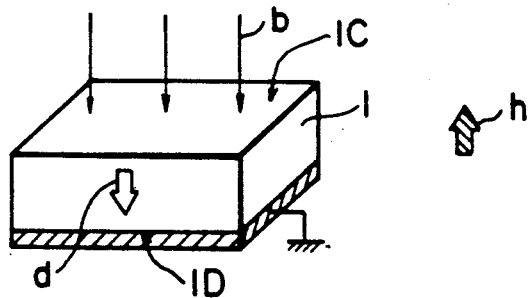
FIG.17B
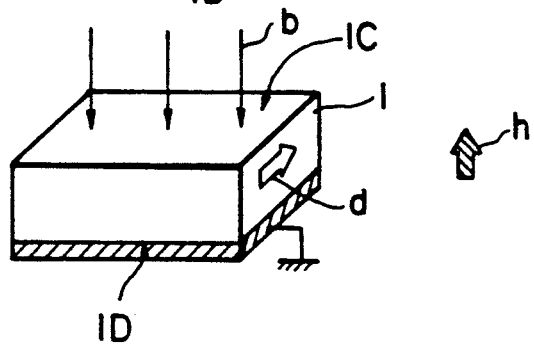
FIG.17C

OPTICAL DEVICE HAVING DOMAIN STRUCTURE AND METHOD FOR MANUFACTURING THE SAME

CROSS-REFERENCES TO RELATED APPLICATIONS

This Application is related to application Ser. No. 729,897, filed Jul. 15, 1991 now U.S. Pat. No. 5,193,023 in which the inventors are Masahiro Yamada and Koichiro Kishima, assigned to the assignee of the present invention, and application entitled "Optical Waveguide And Method For Manufacturing The Same", identified in our files as Case No. P91,1034 Ser. No. 07/747,621, filed Aug. 20, 1991, now U.S. Pat. No. 5,150,447 in which the inventor is Lamada et al. assigned to the assignee of the present invention.

BACKGROUND OF THE INVENTION

1. Field of the Invention

The present invention relates to an optical device of a periodic inverted domain construction suitable for application, for example, to a second harmonic generating device (hereinafter referred to as a "SHG device").

2. Description of Related Art

Recently, techniques have been proposed so as to improve the optical output characteristics of optical devices including SHG devices by forming a periodic inverted domain structure in the surface of a ferroelectric crystal. When a SHG device, for instance, is exposed to light having a frequency of $\omega$, the SHG device generates a second harmonic having a frequency of $2\omega$. Thus, the SHG device expands the wavelength range of light having a single wavelength. This effect of the SHG device expands the field of application of lasers and optimizes the use of lasers in various technical fields. For example, the reduction of the wavelength of a laser beam enables the increase in the recording density for optical recording and reproducing using a laser beam and in magneto-optic recording and reproducing using a laser beam.

There have been proposed a bulk SHG device employing $NbO_3$, and a SHG device of a waveguide type which uses a comparatively large nonlinear optical constant for phase matching, such as a Cerenkov radiation SHG device employing a linear waveguide formed on a single crystal substrate formed of a nonlinear optical material, such as a ferro-electric single crystal of $LiNbO_3$ (LN), and which is capable of emitting a second harmonic, such as green light or blue light, through the substrate in a radiation mode upon the reception of a fundamental wave, such as a near-infrared radiation.

However, the known bulk SHG device has a comparatively low SH-conversion efficiency owing to its intrinsic characteristics and it is unable to employ inexpensive, high-quality LN. The Cerenkov radiation SHG device emits a second harmonic beam into the substrate, and the second harmonic beam emitted by the Cerenkov radiation SHG device forms a spot having an irregular shape, such as a crescent spot, which produces problems in the practical application of the Cerenkov radiation SHG device.

To enable a SHG device to operate at a high conversion efficiency, the respective phase propagation velocities of the fundamental wave and the second harmonic must be the same. The respective phase propagation velocities of the fundamental wave and the second harmonic can be made to coincide with each other by a method proposed in the publication J. A. Armstrong, N. Bloombergen, et al., Phys. Rev., 127, 1918 (1962), in which the "+" and "−" of nonlinear optical constants are periodically arranged. Such an arrangement of the nonlinear optical constant can be achieved by periodically inverting the orientation of the crystallographic axis. The inversion of the orientation of the crystallographic axis can be achieved by a method employing a laminated structure of slices of a crystal such as described in Okada, Takizawa and Ieiri, NHK Gijutsu Kenkyu 29(1), 24 (1977) or by methods employing a periodic domain inversion structure formed by controlling the polarity of the current supplied in forming a crystal by a pulling method as described in D Feng, N. B. Ming, J. F. Hong, et al., Appl. Phys. Lett. 6,228 (1965) A. Foist, P. Koidl, Appl. Phys. Lett. 47, 1125 (1985). These methods desire to form a periodic structure entirely in a crystal. However, the foregoing methods require large apparatus and there is difficulty in controlling the formation of domains.

There has been proposed a method of diffusing Ti into the surface of a crystal to form a periodic domain inversion structure in the surface of the crystal as described in H. Ito, E. Cho, F. Inaba, 49th Oyo Butsuri Gakkai Koen Yoko-shu, 919 (1988). However, the refractive index of the inverted domain formed by this method changes and it is possible that the domain inversion structure emits a plurality of light beams and, in some cases, the fundamental wave leaks.

The applicant of the present patent application proposed a domain method to control the domain of nonlinear optical ferroelectric crystals in Japanese Patent Application No. 1-184362. This method disposes electrodes directly opposite to or indirectly through insulators opposite on the opposite major surfaces of a single-domain ferroelectric crystal, and applies a DC voltage across the electrodes to form local inverted domains to obtain a periodic inverted domain structure. However, as shown in FIGS. 19A and 19B, a periodic inverted domain structure formed by this method has a ratio of $t/W = 1$ or below, where w is the width of an inverted domain region and t is the thickness of the inverted domain region. Therefore, a minute periodic inverted domain structure is formed and the value of the thickness t becomes smaller than the thickness of an optical waveguide. That is, if the width w is about 1.5 $\mu$m so as to form inverted domain regions with a small pitch, the thickness t becomes as small as about 0.5 $\mu$m. Therefore, if the thickness of the optical waveguide is about 1.0 $\mu$m, it is impossible to make the respective phase propagation velocities coincide with each other by periodically arranging the "+" and "−" of the nonlinear optical constant because a periodic inverted domain structure cannot be properly formed in the optical waveguide portion and in the evanescent region, which is one of the causes that prevent the improvement of the efficiency of a SHG device.

A further method of forming a periodic inverted domain structure of a desired pattern by irradiating a nonlinear optical material with an electron beam is proposed in the article of R. W. Keys, A. Loni, B. J. Luff, P. D. Townsend et al., Electronics Letters 1st February 1990 Vol. 26, No. 3. As shown in FIG. 20, this method forms 50 nm thick NiCr layers 62 over the c-faces 61C of a LN substrate 61, i.e., a substrate of nonlinear optical material, and forms 400 nm thick Au layers 63 over the NiCr layers 62, and patterns the Au layer 63 in a predetermined pattern, and irradiates the patterned Au layer 63 with an electron beam. The substrate 61 is heated to about 580° C. and the substrate 61 is irradiated with an electron beam with a total dosage of $10^{17}$ per 9 mm$^2$, i.e. $10^{16}$/mm$^2$, by applying an electric field of 10 V/cm in a direction along its c-axis. However, this method has a disadvantage in that it is possible that the surface of the nonlinear optical material is soiled by the heat treatment at a high temperature and during the application of voltage while the substrate is heated at a high temperature after patterning the electrode layer. The outward diffusion of oxygen molecules from the LN substrate 61, like the outward diffusion of Li, so as to form inverted domain regions may possibly cause the refractive index to vary due to variations of the composition.

SUMMARY OF THE INVENTION

Accordingly, it is an object of the present invention to provide an optical device of a periodic inverted domain construction capable of functioning at a high optical conversion efficiency.

Another object of the present invention is to provide a method of fabricating an optical device of a periodic inverted domain construction, capable of satisfactorily controlling the construction of the periodic inverted domain structure.

In a first aspect of the present invention shown in FIG. 1, an optical device of a periodic inverted domain construction of an optical waveguide type having a periodic inverted domain structure comprises a ferroelectric crystal substrate, and an optical waveguide formed on the surface of the ferro-electric crystal substrate, wherein the ratio of $t/w \geq 1$, where w is the width of the inverted domain regions and t is the thickness of the inverted domain regions. Since the inverted domain regions of the periodic inverted domain structure are formed so as to meet an inequality: $t/w \geq 1$, the thickness t of the inverted domain regions is substantially the same or greater than the thickness $T_{wg}$ of the optical waveguide even if the periodic inverted domain structure is formed in a minute construction.

In a second aspect of the present invention (FIG. 2), an optical device of a periodic inverted domain construction of a bulk type comprises a ferroelectric crystal substrate, and a periodic inverted domain structure, where in $0.1 < t/T \leq 1$, where t is the thickness of the inverted domain regions of the periodic inverted domain structure and T is the thickness of the ferroelectric crystal substrate. Since the inverted domain regions of the periodic inverted domain structure are formed so as to meet an inequality: $0.1 < t/T \leq 1$, the periodic inverted domain structure employing a substrate formed of LN, which could not be employed in the bulk SHG device because of phase matching conditions, is capable of satisfactorily operating with a laser beam having a wavelength of 800 nm.

In a third aspect of the present invention (FIG. 3), a method of fabricating an optical device comprises polarized inversion regions of a periodic inverted domain structure by exposing an entire area of a surface of a single-domain ferroelectric crystal substrate a single-domain ferroelectric crystal substrate, a single-domain ferroelectric crystal substrate with charged particles accelerated by an acceleration voltage of 10 kV or higher for the unit thickness (mm) of the ferro-electric crystal substrate to be formed in which the periodic inverted domain structure is to be formed.

In a fourth aspect of the present invention (FIG. 3), a method of fabricating an optical device comprises forming polarized inversion regions of a periodic inverted domain structure by exposing an entire area of a surface of a single-domain ferroelectric crystal substrate or locally irradiating a single-domain ferroelectric crystal substrate, a single-domain ferro-electric crystal substrate with charged particles having a current density of 1 $\mu$m/mm$^2$ or higher to be formed in which the periodic inverted domain structure is to be formed.

The method of fabricating the optical device of a periodic inverted domain construction uses an acceleration voltage of 10 kV per unit thickness in millimeters or an irradiating current density of 1 $\mu$A/mm$^2$ or higher by exposing an entire area of a surface of a single-domain ferroelectric crystal substrate or locally irradiating a single-domain ferroelectric crystal substrate the ferroelectric crystal substrate to be formed in which the periodic inverted domain structure is to be formed to form the inverted domain regions. Such an acceleration voltage or such an irradiating current density ensures the formation of the inverted domain regions.

FIG. 4 is a graph showing the variations of the area of inverted domain regions formed on a LN single-crystal substrate, i.e., ferro-electric crystal substrate, having a thickness of 1 mm and the acceleration voltages for accelerating charged particles. The +c-face of the LN single-crystal substrate was coated with an aluminum film of about 500 Å in thickness, and the −c-face of the LN single-crystal substrate was irradiated with an electron beam, i.e., a beam of charged particles, at a scanning speed of 50 $\mu$m$^2$/sec. The irradiating width was 4 $\mu$m, the irradiating distance was 140 $\mu$m, and the total irradiated area was 560 $\mu$m$^2$. In FIG. 4, curves A and B are for irradiating current densities of 60 $\mu$A/mm$^2$ and 40 $\mu$A/mm$^2$, respectively, on the surface of the ferroelectric single-crystal substrate. The area of the inverted domain regions is the area on the +c-face. As is obvious from FIG. 4, inverted domain regions are formed when the acceleration voltage is about 10 kV or higher. The acceleration voltage, which is the irradiating energy, required for forming the inverted domain regions increases proportionally with the thickness of the LN single-crystal substrate, i.e., the ferro-electric crystal substrate. Therefore, the required acceleration voltage is 20 kV or higher for a ferro-electric crystal substrate having a thickness of 2 mm, and 5 kV or higher for a ferro-electric crystal substrate having a thickness of 0.5 mm.

FIG. 5 is a graph showing the variations of the area of the inverted domain regions formed on a LN single-crystal substrate, i.e., a ferro-electric crystal substrate, having a thickness of 1 mm and the irradiating current density of the charged particles. The scanning speed of the electron beam and the total irradiated area are the same as those for FIG. 4. In FIG. 5, curves C, D and E are for acceleration voltages of 30 kV, 25 kV and 20 kV, respectively. As is obvious from FIG. 5, inverted domain regions are formed when the irradiating current density is about 1 $\mu$A or higher.

The inverted domain regions formed by irradiation with charged particles under such conditions satisfied the relationship of $t/w \geq 1$. The formation of such inverted domain regions by irradiation with charged particles is believed to be due to the creation of an electric field over the surface of the ferro-electric crystal substrate and the penetration of the charged particles, for example, electrons, into the ferro-electric crystal substrate. Particularly, when charged particles having high irradiating energy are used, an avalanching flow of current occurs when a certain amount of electrons have been accumulated and deep polarity inversion occurs through the ferro-electric crystal substrate.

Since the method in accordance with the present invention does not require the application of a voltage to the ferro-electric crystal substrate nor heating of the ferro-electric crystal substrate, the characteristics of the optical device are not deteriorated by surface contamination of the ferro-electric crystal substrate which results in prior art devices.

Furthermore, since the method in accordance with the present invention does not require outward diffusion of Li and oxygen molecules, a periodic inverted domain structure can be formed without changes in the composition and refractive index of the ferro-electric crystal substrate.

Still further, since the thickness of the inverted domain regions is greater than that of the inverted domain regions formed by the conventional method, an optical guide SHG device formed by the method is capable of functioning with high light conversion efficiency, and the freedom of selection of optical material for a bulk SHG device is increased, and the method is simpler than the conventional method in which slices of a crystal are laminated.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure in which:

BRIEF DESCRIPTION OF THE DRAWINGS

FIG. 16 is a typical sectional view showing a mode of polarization in a ferro-electric crystal formed by irradiation with charged particles;

FIGS. 17A, 17B and 17C are schematic views;

DESCRIPTION OF THE PREFERRED EMBODIMENTS

Methods of fabricating an optical device of a periodic inverted domain construction, embodying the present invention will be described with reference to FIGS. 3 and 6 to 14.

Figure 3:
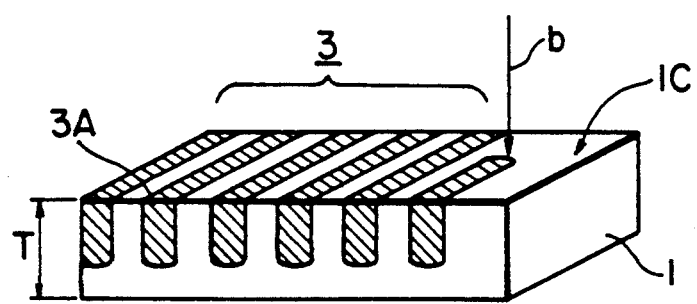
FIG. 3 is a schematic perspective view for use in explaining a first method of fabricating an optical device of a periodic inverted domain construction embodying the present invention.
Figure 4:
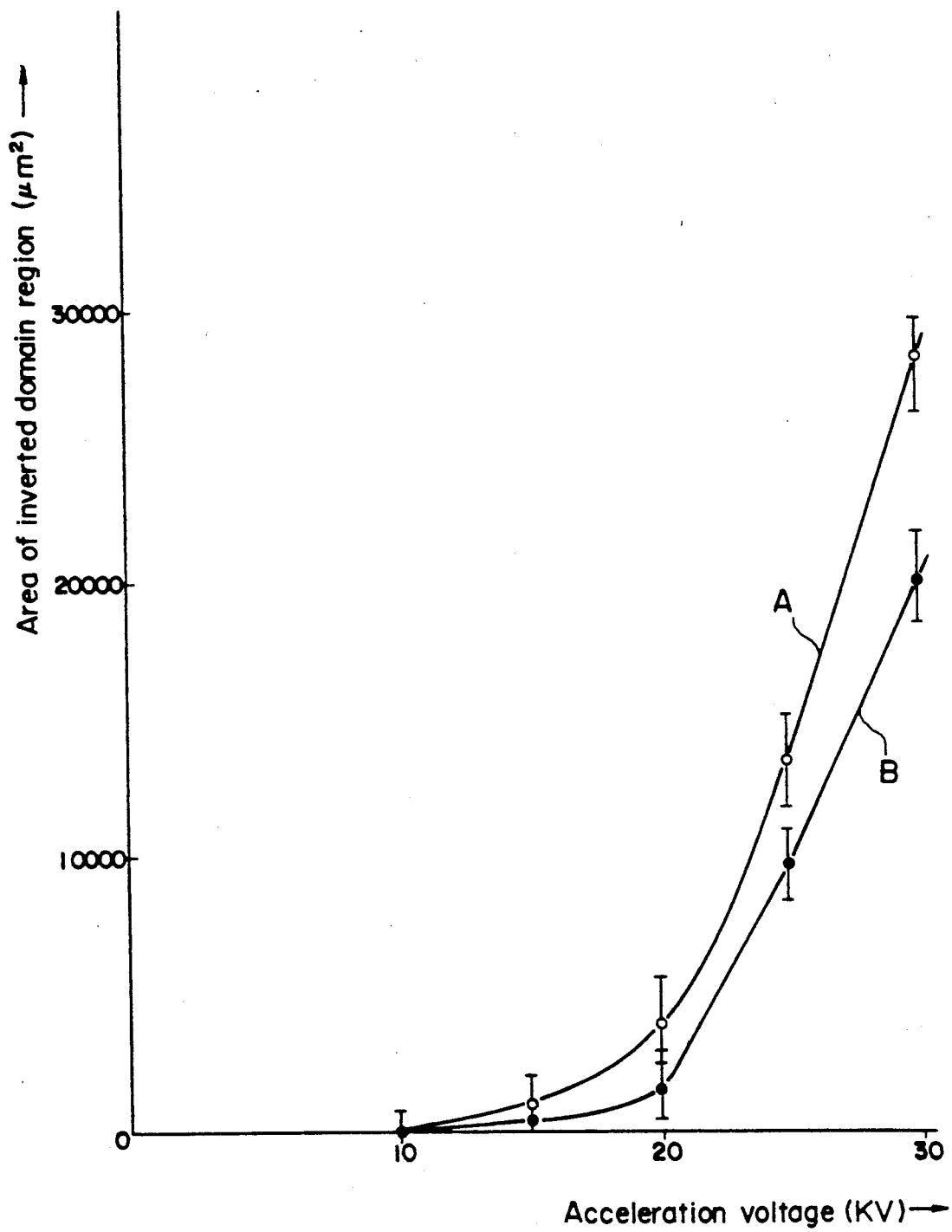
FIG. 4 is a graph showing the dependence of the area of an inverted domain region on the acceleration voltage.
Figure 5:
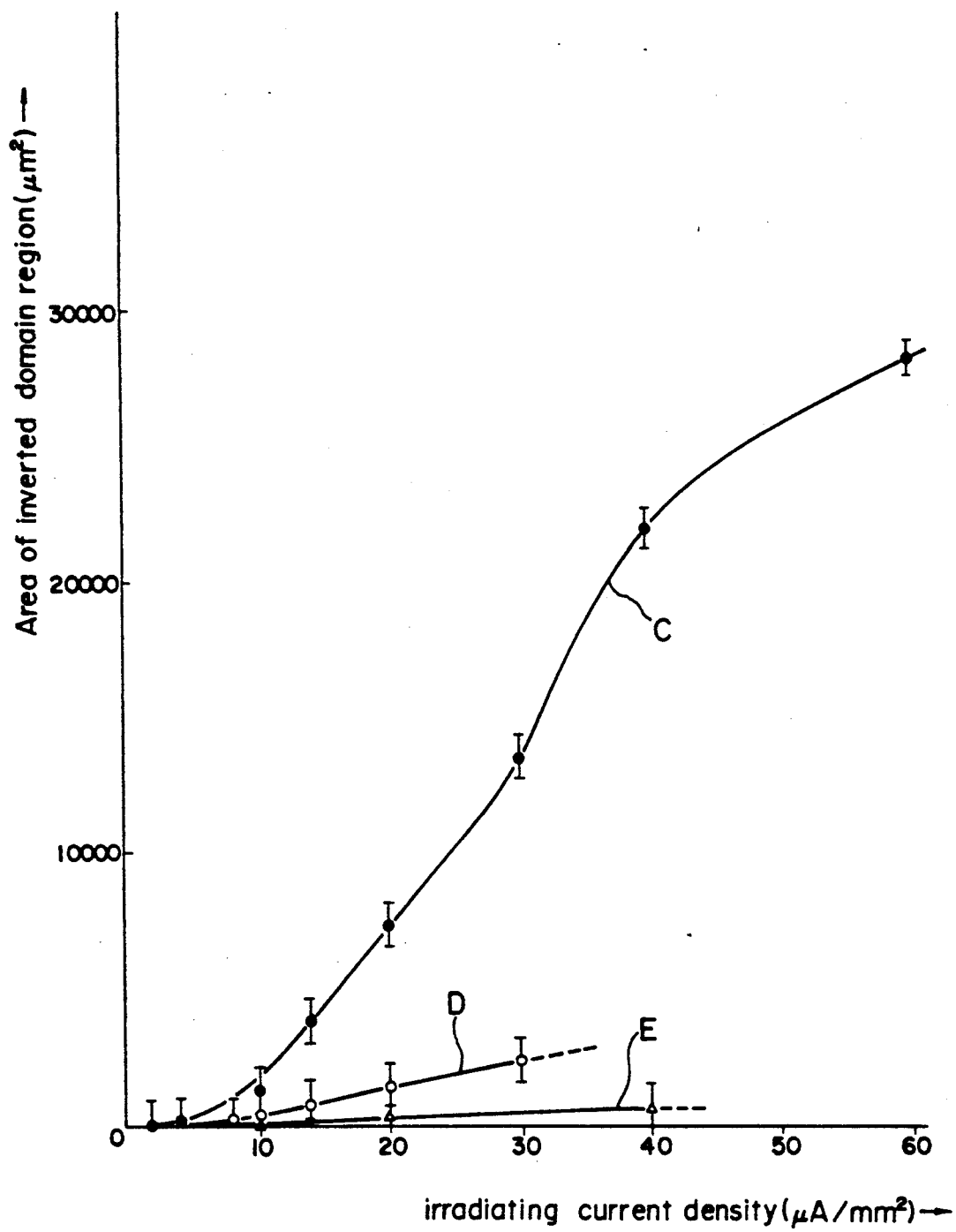
FIG. 5 is a graph showing the dependence of the area of an inverted domain region on the irradiating current density.

First Embodiment (FIG. 3)

A ferro-electric crystal substrate 1 having a thickness of 1 mm is a single crystal of LN (lithium niobate), i.e., a nonlinear optical material. The ferro-electric crystal substrate 1 has the c-axis (Z-axis) along the thickness dimension and the −c-face in the major surface 1C. The ferro-electric crystal substrate 1 is heated to a temperature slightly below the Curie temperature and an external DC voltage is applied thereto across the major surfaces so as to polarize the ferro-electric crystal substrate 1 in a single domain in the orientation of the c-axis.

The major surface 1C of the ferro-electric crystal substrate 1 is irradiated with an electron beam b, i.e., a beam of charged particles with an acceleration of about 15 kV and an energy of 15 keV, and at about 1 μA current density in a pattern of regularly arranged parallel strips as shown in FIG. 3 to form a periodic inverted domain structure 3 consisting of inverted domain regions 3A.

Figure 6:
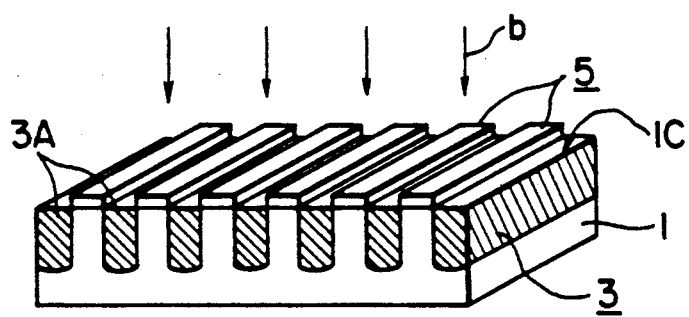
FIG. 6 is a schematic perspective view for use in explaining a second method of fabricating an optical device of a periodic inverted domain construction embodying the present invention.

Second Embodiment (FIG. 6)

A ferro-electric crystal substrate 1 having a thickness of 1 mm is formed of a LN single crystal and is polarized in the direction of its thickness in a single domain. A conductive film, such as a Au film, is formed over the entire area of the major surface 1C of the ferro-electric crystal substrate 1 by vapor deposition. Then, regularly arranged parallel conductive strips 5 as shown in FIG. 6 are formed by a photolithographic process which includes the steps of forming a photoresist film over the conductive film, exposing the photoresist film in a predetermined pattern corresponding to the pattern of the regularly arranged parallel conductive strips 5, developing the exposed photoresist film, and etching the conductive film by an anisotropic etching process to remove it at areas between strips 5.

Then, the entire area of the major surface 1C of the ferroelectric crystal substrate 1 is exposed by an electron beam b under the same conditions as those employed in the first embodiment. The regions covered by the conductive strips 5 are shielded from the electron beam b and hence the polarity of those regions are not inverted. Thus, the polarity of the ferro-electric crystal substrate 1 is locally inverted to form a periodic inverted domain structure 3.

Figure 7:
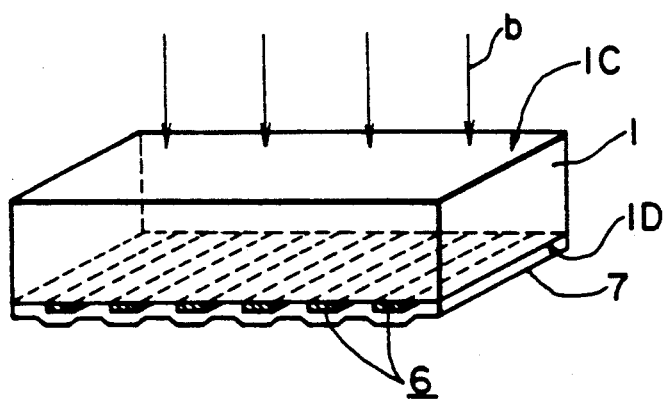
FIG. 7 is a schematic perspective view for use in explaining a third method of fabricating an optical device of a periodic inverted domain construction embodying the present invention.
Figure 8:
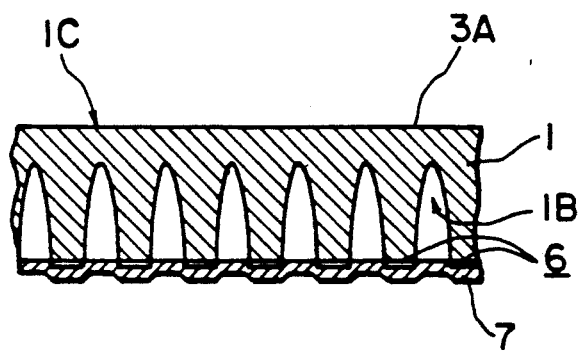
FIG. 8 is a typical sectional view for use in explaining polarity inversion in a ferro-electric crystal by irradiation with charged particles.

Third Embodiment (FIGS. 7 and 8)

Referring to FIG. 7, a ferroelectric crystal substrate 1 of single crystal LN having a thickness of 1 mm is polarized in the direction of its thickness in a single domain. A photoresist film having a thickness of 1 mm or an insulating film, such as an alumina film, is formed over the rear or back major surface 1D, which is the +c-face, of the ferro-electric crystal substrate 1, and then the insulating film is subjected to a photolithographic process to form regularly arranged parallel insulating strips 6. Then, a conductive film 7, such as an ITO film, is formed over the back major surface 1D so as to cover the insulating strips 6. Then, the entire area of the major surface 1C of the ferro-electric crystal substrate 1 is exposed by with an electron beam b under the same conditions as those employed in the first embodiment.

As shown in FIG. 8, which is a sectional view along the Y-axis of the ferro-electric crystal substrate 1 of FIG. 6, a periodic inverted domain structure 3 has inverted domain regions 3A formed in a portion of the ferroelectric crystal substrate 1 near the back major surface 1D which it is believed is due to the concentration of the current and the voltage in a portion of the ferro-electric crystal substrate 1 including the conductive film 7.

Figure 9:
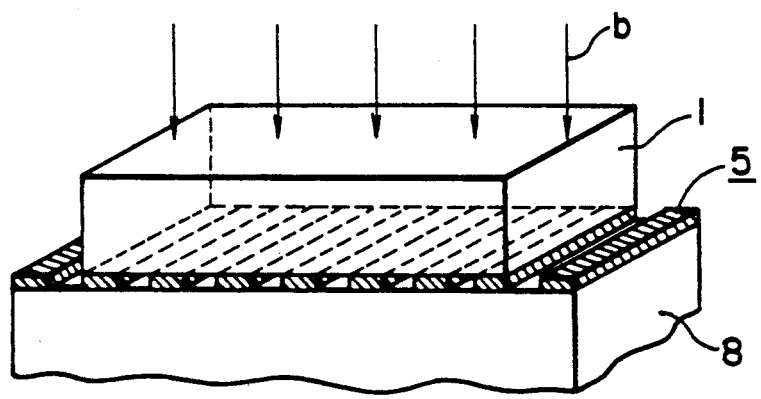
FIG. 9 is a schematic perspective view for use in explaining a fourth method of fabricating an optical device of a periodic inverted domain construction, embodying the present invention.

Fourth Embodiment (FIG. 9)

Referring to FIG. 9, a ferro-electric crystal substrate 1 formed of single crystal LN having a thickness of 1 mm is polarized in the direction of its thickness in a single domain. The ferro-electric crystal substrate 1 is placed on an insulating substrate 8 provided with regularly arranged parallel conductive strips 15 with the +c-face in contact with the conductive strips 15. Then, the entire area of the major surface of the ferro-electric crystal substrate 1 is exposed by with an electron beam b under the same conditions as those employed in the first embodiment to form a periodic inverted domain structure on the ferro-electric crystal substrate 1.

Although the −c-face of the ferro-electric crystal substrate 1 of a LN single crystal is irradiated with an electron beam to form the periodic inverted domain structure in the foregoing embodiments, it is also possible to irradiate the +c-face with $Li^+$ ions and to use a ferro-electric crystal substrate made of other material, such as KTP.

In the fifth to seventh embodiments, a surface of a ferro-electric crystal substrate 1 which is parallel to the direction of polarization is indicated by an arrow d (FIG. 10) which is in the X-face perpendicular to the −z-face or the Y-face, is irradiated by an electron beam which is a beam of charged particles. The fifth to seventh embodiments use a ferro-electric crystal substrate of LN single crystal which is polarized in the orientation of the c-axis by the same method as that employed in the first embodiment.

Figure 10:
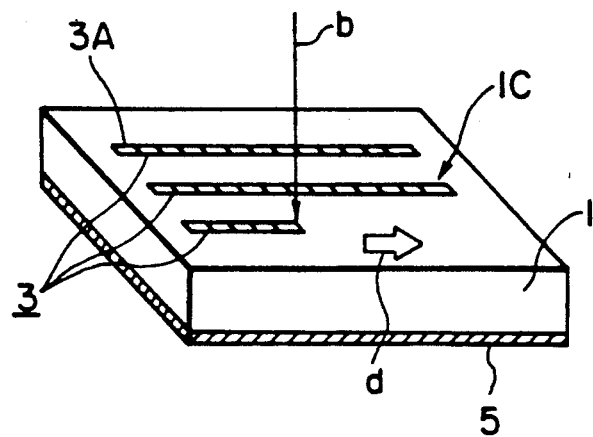
FIG. 10 is a schematic perspective view for use in explaining a fifth method of fabricating an optical device of a periodic inverted domain construction embodying the present invention.

Fifth Embodiment (FIG. 10)

A ferro-electric crystal substrate 1 of LN single crystal has its major surface 1C extending in the direction of polarization. After depositing a conductive film 25, such as a Au film, over the back major surface 1D of the ferro-electric crystal substrate 1, the major surface 1C is irradiated with an electron beam b, i.e., a beam of charged particles, in a pattern of regularly arranged parallel strips which extend in the direction of polarization under the same conditions as those employed in the first embodiment. The polarity of the regions in the back major surface 1D corresponding to the regularly arranged parallel strips of the irradiated pattern in the major surface 1C which is irradiated by the electron beam b are inverted to form a periodic inverted domain structure which has parallel inverted domains that extend across the parallel stripes of the irradiated pattern.

Figure 11:
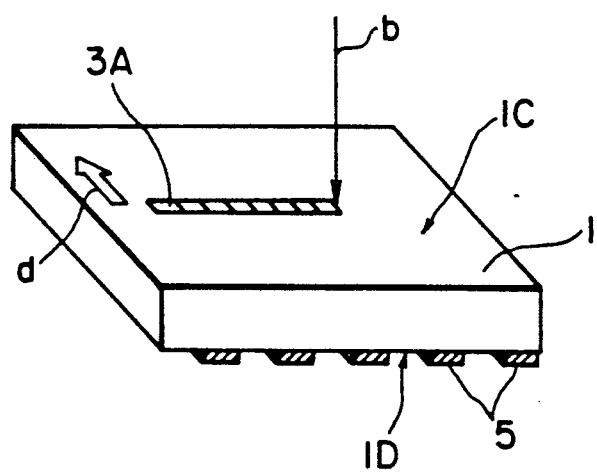
FIG. 11 is a schematic perspective view for use in explaining a sixth method of fabricating an optical device of a periodic inverted domain construction embodying the present invention.
Figure 12:
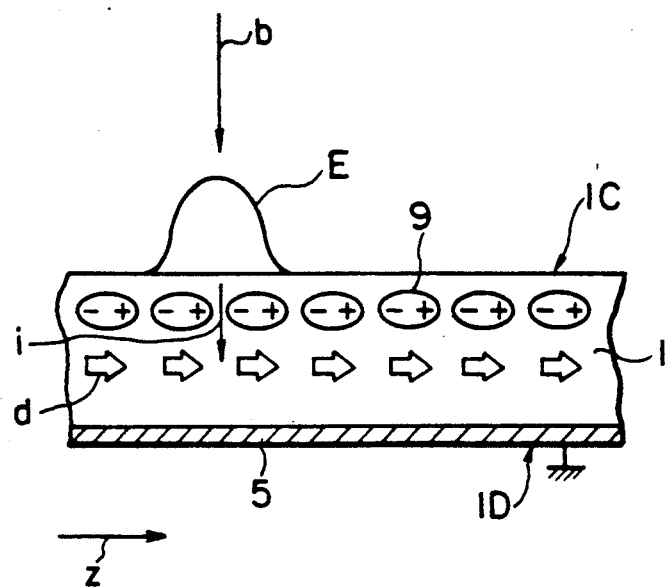
FIG. 12 is a typical sectional view showing a mode of polarization in a ferro-electric crystal formed by irradiation with charged particles.
Figure 13:
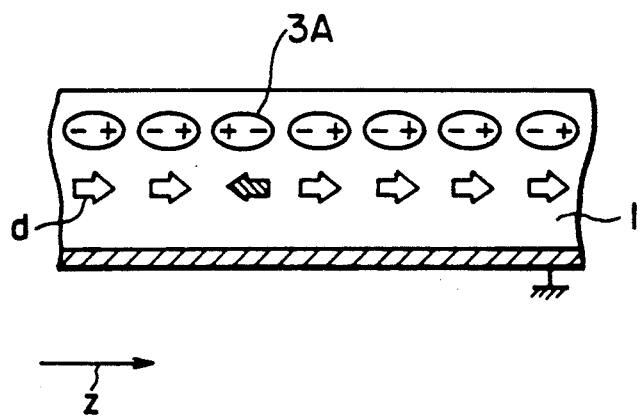
FIG. 13 is a typical perspective view showing a mode of polarization in a ferro-electric crystal formed by irradiation with charged particles.

Sixth Embodiment (FIGS. 11, 12 and 13)

Referring to FIG. 11, a ferro-electric crystal substrate 1 of LN single crystal has its major surface 1C extending in the direction of polarization. A conductive film is deposited over the entire back major surface 1D by vapor deposition. The conductive film is subjected to a photolithographic process to form parallel conductive strips 35 which extend in the direction of polarization indicated by an arrow d. Then, the major surface 1C is irradiated with an electron beam b, i.e., a beam of charged particles, in a pattern of parallel strips which extend in a direction which is perpendicular to the direction of polarization indicated by the arrow d under the same conditions as those employed in the first embodiment. The polarity of the regions in the major surface 1C corresponding to the parallel conductive strips 35 in the back major surface 1D is inverted to form a periodic inverted domain structure having regularly arranged parallel inverted domains extending across the direction of extension of the conductive strips 35.

The mode of inversion of the polarity when the surface of the ferroelectric crystal substrate 1 extends in the direction of polarization is irradiated with the electron beam b perpendicular to the same surface is shown in FIG. 12. As shown in FIG. 12, domains 9 in the ferroelectric crystal substrate 1 are polarized as indicated by arrows d. When the ferroelectric crystal substrate 1 is formed of LN single crystal, the domains are polarized with the orientation of the c-axis (Z-axis). Indicated by 35 is the conductive strip, such as an Au strip. When the major surface 1C of the ferroelectric crystal substrate 1 is irradiated with an electron beam b, some of the electrons of the electron b remain in the irradiated regions to create an electric field E over the major surface 1C, while some of the electrons of the electron beam b penetrate into the ferroelectric crystal substrate 1 to produce a current as indicated by an arrow 1. Consequently, domains in the irradiated regions are inverted in the direction of the electric field E or the current indicated by the arrow i.

Figure 14:
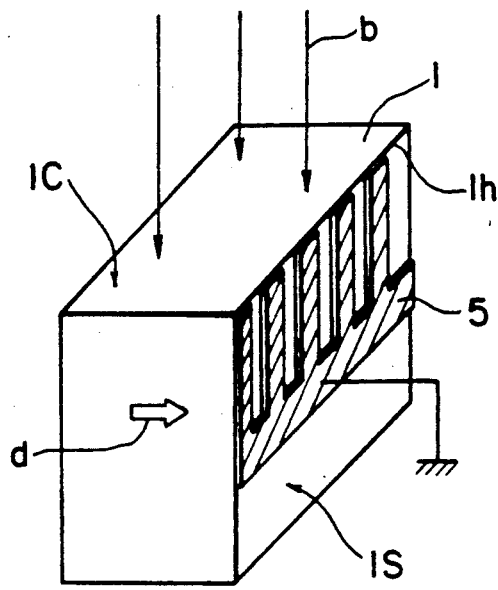
FIG. 14 is a schematic perspective view for use in explaining a seventh method of fabricating an optical device of a periodic inverted domain construction embodying the present invention.
Figure 15:
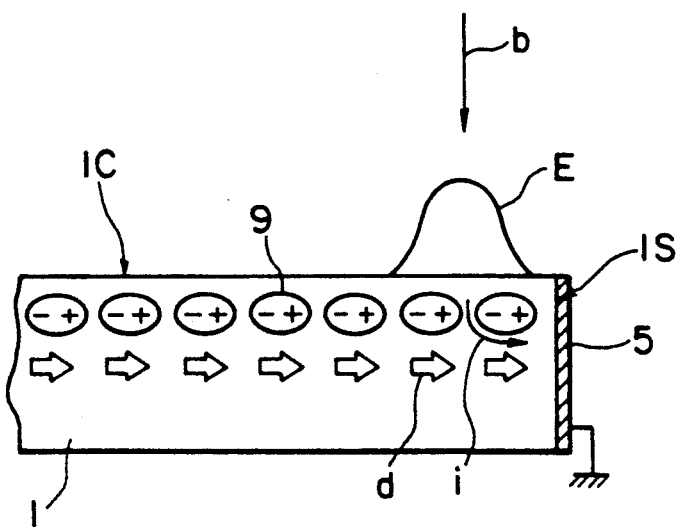
FIG. 15 is a typical sectional view showing a mode of polarization in a ferro-electric crystal formed by irradiation with charged particles.

Seven Embodiment (FIGS. 14, 15 and 16)

A ferroelectric crystal substrate 1 of LN single crystal has its major surface 1C extending in the direction of polarization indicated by an arrow d. A side surface 1S of the ferroelectric crystal substrate 1 which is perpendicular to the direction of polarization is coated with a conductive film, such as Au film, by vapor deposition. Then, the conductive film is subjected to a photolithographic process to form conductive strips 45 which are arranged in the shape of a comb. One end of such conductive strip 45 is contiguous with an edge 1h where the major surface 1C extends in the direction of polarization and the side surface 1C meet each other. Then, the entire area of the major surface 1C is exposed with an electron beam b, i.e., a beam of charged particles under the same conditions as those employed in the first embodiment to form a periodic inverted domain structure extending across the conductive strips 45 formed on the side surface 1S in regions in the side surface 1S corresponding to the conductive strips 45.

The mode of inversion of the polarity when the conductive strips 45 are formed on the surface of the ferroelectric substrate which is perpendicular to the direction of polarization and the surface extending in the direction of polarization is irradiated with the electron beam b is shown in FIG. 15 which corresponding to FIG. 12 and the description thereof will be omitted. When the major surface 1C of the ferroelectric crystal substrate 1 is irradiated with the electron beam b, some of the electrons of the electron beam b remain in the irradiated regions to create an electric field E, while some of the electrons of the electrons beam b penetrate into the ferroelectric crystal substrate to produce a current that flows toward the conductive strips 45 as indicated by an arrow i and, consequently, the domains 9 are inverted accordingly to form inverted domain regions 3A in the vicinity of the conductive strips 45 as shown in FIG. 16.

In the fifth, sixth and seventh embodiments, the shape of the inverted domain regions 3A can more satisfactorily be controlled to form the periodic inverted domain structure in a sharper pattern when the conductive strips 25, 35 and 45 are grounded as shown in FIGS. 10, 11 and 14 than when the conductive strips 25, 35 and 45 are electrically floating.

Although an electron beam of the acceleration voltage of 15 kV and the current density of 1 $\mu A/mm^2$ is used in the fifth, sixth and seventh embodiments, a desirable acceleration voltage is 10 kV or higher, more desirably, 15 kV or higher for the unit thickness in millimeter of the ferroelectric crystal substrate 1, and a desirable irradiating current density is 1 $\mu A$ or higher. The acceleration voltage must be lower than 200 kV or lower for unit thickness in millimeters of the ferroelectric crystal substrate 1 because breakdown can occur in the ferroelectric crystal substrate 1 if the acceleration voltage is 200 kV or higher for unit thicknesses in millimeters of the ferroelectric crystal substrate 1. The irradiating current density must be lower than 1 $A/mm^2$ because breakdown or thermal degradation can occur in the ferroelectric crystal substrate 1 if the irradiating current density is 1 $A/mm^2$ or higher.

It is believed that inverted domain regions can readily be formed in the ferroelectric crystal substrate 1 of LN single crystal polarized in the orientation of the c-axis, which is a ferroelectric crystal substrate of 180° polarization.

The method in accordance with the present invention is capable of forming inverted domain regions also in a ferroelectric crystal substrate having directions of polarization in the two crystallographic axes, such as a ferroelectric crystal substrate of barium titanate ($BaTiO_3$) crystal, which is a ferroelectric crystal substrate of 90° polarization. Methods of forming inverted domain regions in such a ferroelectric crystal substrate will be described hereinafter with reference to FIGS. 17A, 17B, 17C, 18A, 18B and 18C. In the following embodiments, ferroelectric crystal substrates are polarized in a single domain by the same procedure as than employed in the first embodiment, in which the ferroelectric crystal substrate 10 is polarized in the direction of the arrow d.

Referring to FIGS. 17A to 17C, a ferroelectric crystal substrate 101 has a major surface 10C which is irradiated with an electron beam b, and a back major surface 10D on which are formed conductive strips 55. Polarity-inverted regions polarized in the direction of an arrow h are formed in the vicinity of regions in the back major surface 10D corresponding to irradiated regions in the major surface 10C. If the ferroelectric crystal substrate 101 is polarized in a single domain in a direction parallel to the major surface 10C as shown in FIGS. 17A and 17C, the polarity of the irradiated regions is changed by 90°. If the ferroelectric crystal substrate 101 is polarized in a single domain in a direction perpendicular to the major surface 10C as shown in FIG. 17B, the polarity of the irradiated regions is changed by 180°.

Figure 18A:
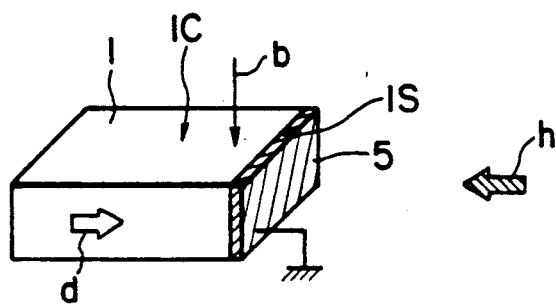
FIGS. 18A, 18B and 18C are a schematic perspective view showing a mode of polarization in a ferro-electric crystal formed by irradiation with charged particles.
Figure 18B:
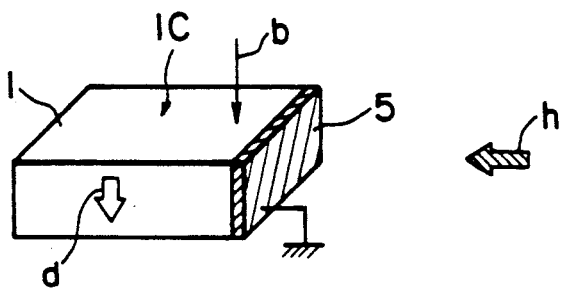
Figure 18C:
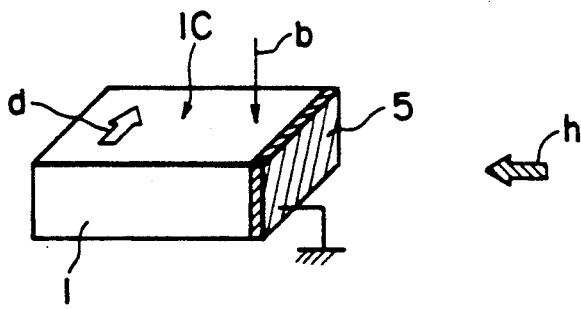
Figure 19A:
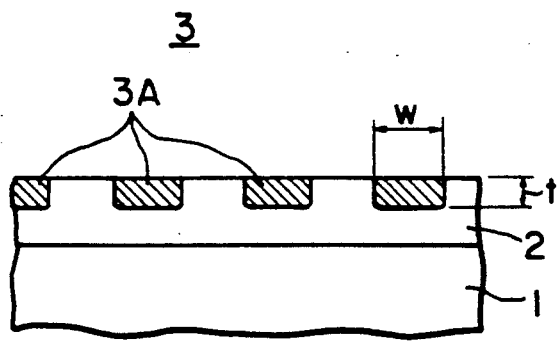
FIGS. 19A and 19B are schematic sectional views of conventional inverted domain structures.
Figure 19B:
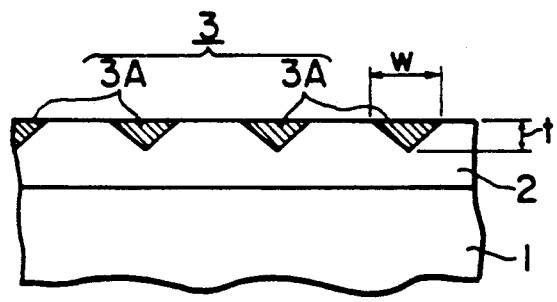
Figure 20:
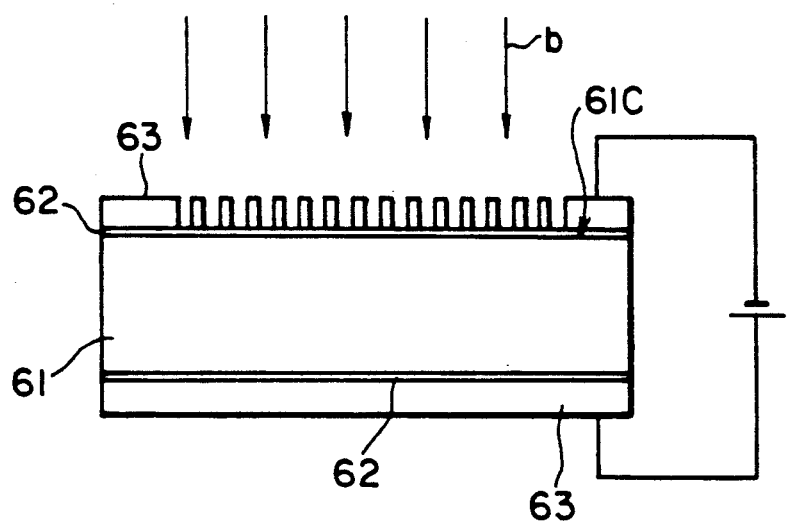
FIG. 20 is a schematic perspective view for use in explaining a conventional method of fabricating a periodic inverted domain structure.

Referring to FIGS. 18A to 18C, a ferroelectric crystal substrate 100 has a major surface 100C which is irradiated with an electron beam b, and a side surface 100S perpendicular to the major surface 100C. A conductive film 65 is formed on the side surface 100S. When a region of the major surface 100C near the conductive film 65 is irradiated with the electron beam b, an inverted domain region polarized in the direction of an arrow h, i.e., a direction toward the interior of the ferroelectric crystal substrate 100, perpendicular to the side surface 100S is formed in the vicinity of the conductive film 65 in the side surface 100S. Thus, polarity inversion through an angle of 180° occurs in the irradiated regions in the side surface 100S of the ferroelectric crystal substrate 100 if the ferroelectric crystal substrate 100 is polarized in a single domain in a direction opposite the direction of polarity inversion as shown in FIG. 18A. Polarity inversion through an angle of 90° occurs in the irradiated regions in the side surface 100S of the ferroelectric crystal substrate 100 if the ferroelectric crystal substrate 100 is polarized in a single domain in a direction along the side surface 100S as shown in FIGS. 18B and 18C.

A periodic inverted domain structure can be formed in the ferroelectric crystal substrate 100 of 90° polarization by properly determining the direction of polarization and the direction of travel of the electron beam b.

Although the current and the voltage are concentrated in regions corresponding to the conductive or insulating strips which are formed by patterning a conductive or insulating film, attaching conductive or insulating strips to the surface or depositing conductive or insulating strips on the surface, to form the inverted domain regions in the third, fourth, sixth and seventh embodiments, any other suitable means may be employed to obtain the same results.

Optical devices fabricated by the foregoing methods in accordance with the present invention will be described hereinafter.

Figure 1:
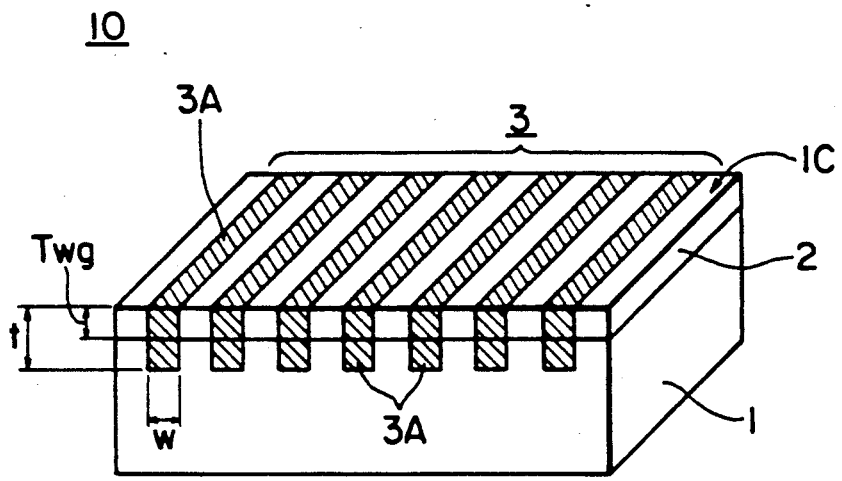
FIG. 1 is a perspective view of an optical device of a periodic inverted domain construction in a first embodiment according to the present invention.

Eighth Embodiment (FIG. 1)

A periodic inverted domain structure 3 as shown in FIG. 1 is formed by the method in the first embodiment. The inverted domain regions 3A of the periodic inverted domain structure 3 have a width w, of for example, 1.5 $\mu$m, and a thickness t, of for example, 3.0 $\mu$m so as to meet the criteria of $t/w \geq 1$.

An optical waveguide 2 having a thickness $T_{wg}$ of 1.0 $\mu$m is formed by a proton exchange process or the like over the major surface 1C including the periodic inverted domain structure 3 to complete an optical device 10.

In the optical device 10 thus fabricated, the periodic inverted domain structure 3 is formed through the thickness of the optical waveguide 2 and in the ferroelectric crystal substrate 1 and the periodic inverted domain structure 3 is formed in the optical waveguide 2 and its evanescent region. Therefore, the SHG device of an optical waveguide type is capable of functioning at a high conversion efficiency.

Ninth Embodiment

Figure 2:
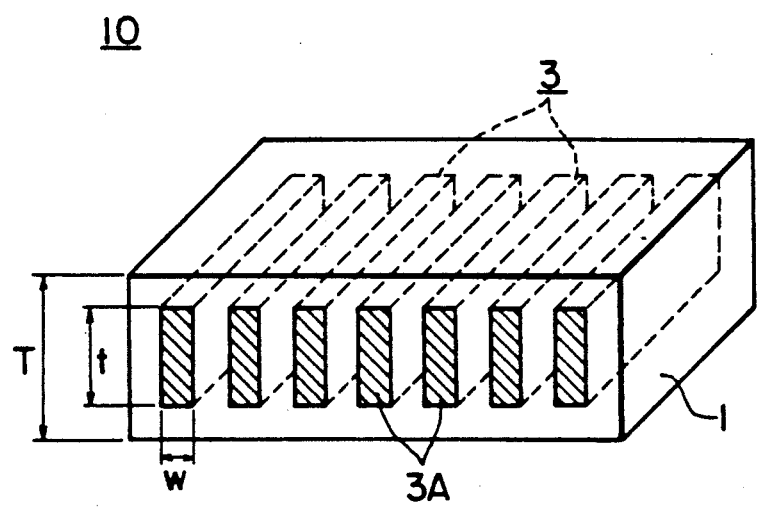
FIG. 2 is a schematic perspective view of an optical device of a periodic inverted domain construction in a second embodiment according to the present invention.

A periodic inverted domain structure 3 for an optical device 10, i.e., a bulk SHG device is formed in the central portion of a bulk ferroelectric crystal substrate with respect to the thickness of the same by the method as in the first embodiment by properly determining the irradiating energy of the electron beam. As shown in FIG. 2, the thickness T of the ferroelectric crystal substrate 1 and the thickness 5 of the inverted domain regions 3A of the periodic inverted domain structure 3 are determined so as to meet the criteria of $0.1 < t/T \leq 1$. For example, $t = 100$ $\mu$m and $T = 500$ $\mu$m.

Since the periodic inverted domain structure 3 can be formed in a predetermined portion of the ferroelectric crystal substrate 1, the ferroelectric crystal substrate 1 may be formed of a material which could not have been used for a bulk SHG device for a semiconductor laser that emits a laser beam of a wavelength of 900 nm or smaller, such as LN. Thus, the freedom of selection of materials for the ferroelectric crystal substrate 1 is increased and the bulk SHG device functions at a high conversion efficiency due to the invention.

Although the invention has been described as applied to a SHG device and to a method of fabricating the same, the present invention is applicable also to a THG device (third harmonic generating device) or an optical parametric oscillation device and a method of fabricating the same.

Although the method in accordance with the present invention is capable of forming a periodic inverted domain structure at a normal temperature, it is possible to carry out the method to form a periodic inverted domain structure on a ferroelectric crystal substrate which is heated at a comparatively low temperature.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

We claim as our invention:

1. A method of fabricating an optical device comprising a ferroelectric crystal substrate of single lithium niobate which is provided with a periodic inverted domain structure, said method comprising the steps of, aligning the respective c-axes of domains of the ferroelectric substrate in a first direction, forming a plurality of parallel insulating strips on a back surface of said substrate, forming a conductive film over said plurality of parallel insulating strips and said back surface of said substrate, and exposing the front surface of said substrate to a beam of charged particles to form a periodic inverted domain structure, wherein said beam of charged particles is applied with an accelerating voltage of 10 kV or higher for unit thickness in millimeters of the ferroelectric crystal substrate, and wherein said beam of charged particles uses a current of an irradiation current density of 1 $\mu$A//mm$^2$ or higher.

2. A method of fabricating an optical device comprising a ferroelectric crystal of single crystal of single crystal lithium niobate substrate which is provided with a periodic inverted domain structure, said method comprising the steps of, aligning the respective c-axes of domains of the ferroelectric substrate in a first direction, forming a plurality of parallel conductive strips which do not allow charged particles to pass therethrough on an insulating substrate, placing said crystal substrate on said insulating substrate, and exposing the front surface of said crystal substrate to a beam of charged particles to form a periodic inverted domain structure, wherein said beam of charged particles is applied with an accelerating voltage of 10 kV or higher for unit thickness in millimeters of the ferroelectric crystal substrate, and wherein said beam of charged particles uses a current of an irradiation current density of 1 $\mu$Amm$^2$ or higher.

* * * * *